(12) United States Patent
Bookheimer

(10) Patent No.: US 12,697,665 B2
(45) Date of Patent: Aug. 4, 2026

(54) MODULAR DRILL WITH DOUBLE SIDED CAM

(71) Applicant: Kennametal Inc., Latrobe, PA (US)

(72) Inventor: Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 510 days.

(21) Appl. No.: 17/979,626

(22) Filed: Nov. 2, 2022

(65) Prior Publication Data

US 2024/0139832 A1 May 2, 2024

(51) Int. Cl.
*B23B 51/00* (2006.01)

(52) U.S. Cl.
CPC ................................ *B23B 51/0003* (2022.01)

(58) Field of Classification Search
CPC . B23B 51/0002; B23B 51/0003; B23B 51/02; B23B 51/0004; B23B 2240/00; B23B 2240/36; B23B 2260/02; B23B 2270/08; B23B 2251/02; B23B 2205/08; B23B 2205/04; B23B 29/03428; B23B 29/03478; B23B 29/03482; B23B 29/03485; B23C 2260/12; B23C 2210/02; B23C 2277/02; B23C 2277/06; Y10T 408/9098
See application file for complete search history.

(56) References Cited

U.S. PATENT DOCUMENTS

| | | | | |
|---|---|---|---|---|
| 2,511,884 A | * | 6/1950 | Thomas | ............ B23B 29/03428 |
| | | | | 279/6 |
| 4,729,702 A | | 3/1988 | Kelm | |
| 4,976,574 A | | 12/1990 | Muendlein et al. | |
| 6,012,881 A | | 1/2000 | Scheer | |
| 9,669,470 B2 | | 6/2017 | Matlik | |
| 2002/0139587 A1 | | 10/2002 | Mast et al. | |

(Continued)

FOREIGN PATENT DOCUMENTS

| | | |
|---|---|---|
| CN | 87106927 A | 4/1988 |
| CN | 109365844 A | 2/2019 |

(Continued)

OTHER PUBLICATIONS

Notice of Allowance for U.S. Appl. No. 17/979,686, 07 Pages.
Jun. 11, 2025 Non Final Rejection U.S. Appl. No. 17/979,686, 08 Pages.

*Primary Examiner* — Sunil K Singh
*Assistant Examiner* — Eric Daniel Whitmire
(74) *Attorney, Agent, or Firm* — Christopher J. Owens

(57) ABSTRACT

A modular drill is disclosed. The modular drill includes a tool shank extending from a shank top end to a shank bottom end along a rotational axis and includes a cam slot extending at least partially through a width of the tool shank. The modular drill also includes a cutting head centered on the rotational axis including a cutting head top surface, a cutting head bottom surface, a draw pin extending from the cutting head bottom surface along the rotational axis, and a draw pin groove around at least a partial length of a circumference of the draw pin comprising a cam follower surface. The modular drill includes a double sided cam received within the cam slot of the tool shank and includes at least one cam surface contacting the cam follower surface.

18 Claims, 15 Drawing Sheets

(56)             References Cited

U.S. PATENT DOCUMENTS

| 2006/0140736 | A1* | 6/2006 | Kress | ................. | B23B 2260/02 |
|---|---|---|---|---|---|
| 2010/0322723 | A1 | 12/2010 | Danielsson | | |
| 2011/0110739 | A1 | 5/2011 | Frisendahl | | |
| 2011/0236145 | A1 | 9/2011 | Päbel et al. | | |
| 2014/0154023 | A1 | 6/2014 | Craig | | |
| 2015/0360300 | A1 | 12/2015 | Hecht | | |
| 2016/0195119 | A1* | 7/2016 | Bookheimer | ........... | F16B 19/02 |
| | | | | | 403/376 |
| 2019/0126361 | A1 | 5/2019 | Hecht et al. | | |
| 2022/0118526 | A1 | 4/2022 | Gey et al. | | |

FOREIGN PATENT DOCUMENTS

| KR | 20140056226 A | 5/2014 |
|---|---|---|
| WO | 2013073690 A1 | 5/2013 |

* cited by examiner

MODULAR DRILL WITH DOUBLE SIDED CAM

FIELD OF THE INVENTION

The present invention relates to modular drills, and more particularly a cam for securing a cutting head in a drill body of a modular drill.

BACKGROUND INFORMATION

Modular drills are used in a variety of applications. The modular drills often include a cutting head secured to a tool holder assembly. After wear, it is often desired to replace the cutting head of the modular drills. However, this often requires a significant amount of effort and time. The tool holder itself may need to be removed prior to the removal of the cutting head. The use of a double sided cam may allow for a decrease in changeout time of the cutting head while still allowing for a secure hold of the cutting head during operation.

SUMMARY OF THE INVENTION

The present invention provides a modular drill. The modular drill includes a tool shank extending from a shank top end to a shank bottom end along a rotational axis and includes a cam slot extending at least partially through a width of the tool shank. The modular drill also includes a cutting head centered on the rotational axis including a cutting head top surface, a cutting head bottom surface, a draw pin extending from the cutting head bottom surface along the rotational axis, and a draw pin groove around at least a partial length of a circumference of the draw pin comprising a cam follower surface. The modular drill includes a double sided cam received within the cam slot of the tool shank and includes at least one cam surface contacting the cam follower surface.

Another aspect of the present invention is to provide a cutting head for a modular drill. The cutting head includes a cutting head top surface opposite a cutting head bottom surface centered along a rotational axis. The cutting head also includes a draw pin extending from the cutting head bottom surface along the rotational axis and a draw pin groove extending around at least a partial length of a circumference of the draw pin comprising a cam follower surface wherein the cam follower surface is structured and arranged to follow a cam surface.

Another aspect of the present invention is to provide a double sided cam for a modular drill. The double sided cam includes a front portion extending along a central axis from a front portion top wall to a front portion bottom wall. The double sided cam also includes a rear portion opposite the front portion extending along the central axis from a rear portion top wall to a rear portion bottom wall. The front portion bottom wall includes a front cam surface extending parallel to the central axis and a front portion groove extending from an outer diameter of the front portion toward the central axis. The rear portion bottom wall includes a rear cam surface extending parallel to the central axis.

These and other aspects of the present invention will be more apparent from the following description.

DETAILED DESCRIPTION

The modular drill of the present invention addresses the issues mentioned above by providing a double sided cam that can lock a cutting head in place. The double sided cam can receive a draw pin of a cutting head. Rotation of the double sided cam can cause cam surfaces of the double sided cam to come in contact with the draw pin and hold the draw pin in place.

The double sided cam provides several benefits to modular drills. The double sided cam can be rotated from the side of the modular drill, allowing the cutting head of the modular drill to be installed and discharged while the tool shank remains installed. This decreases time necessary to replace the cutting heads. It also increases worker safety by providing a simpler method of replacing cutting heads.

Referring to FIGS. 1-4, a modular drill 10 is shown including a cutting head 100 releasably secured to a tool shank 200 by a double sided cam 300. The tool shank 200 may be structured and arranged to be secured into a tool holder.

Figure 1:
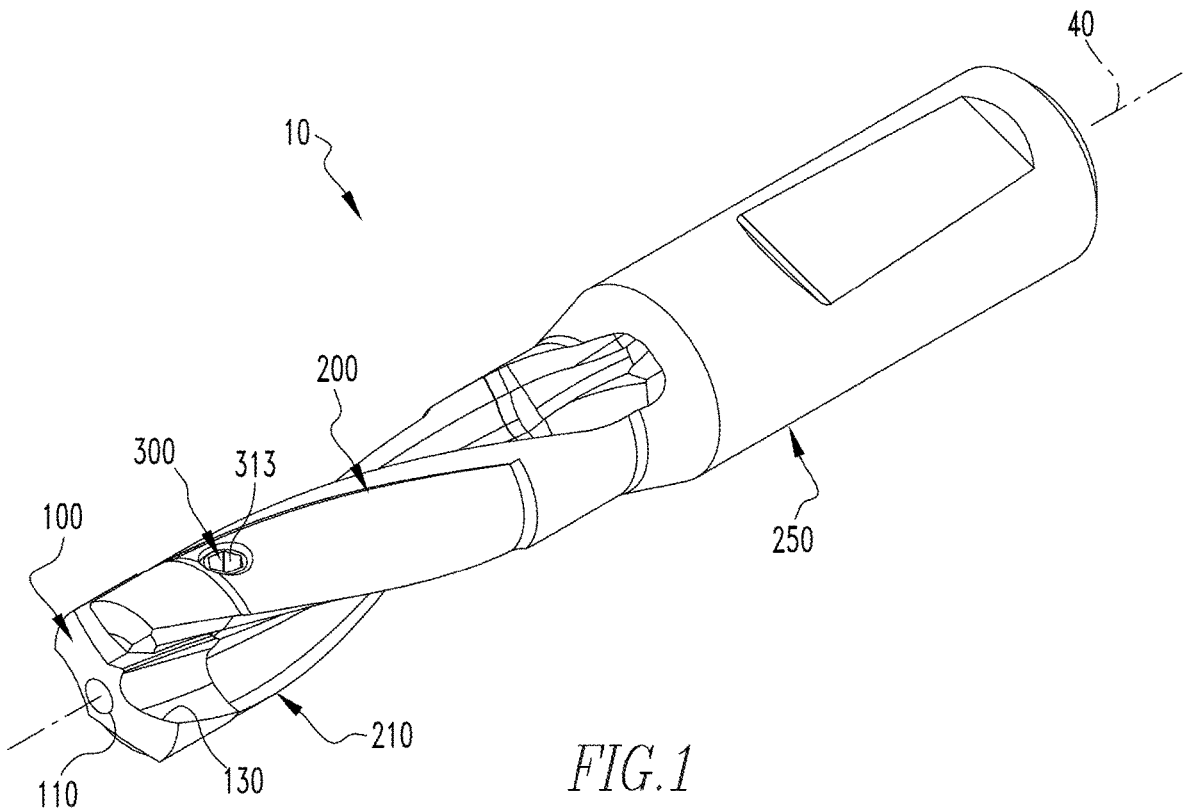
FIG. 1 is an isometric view of a modular drill in accordance with an embodiment of the present invention.
Figures 2A, 2B:
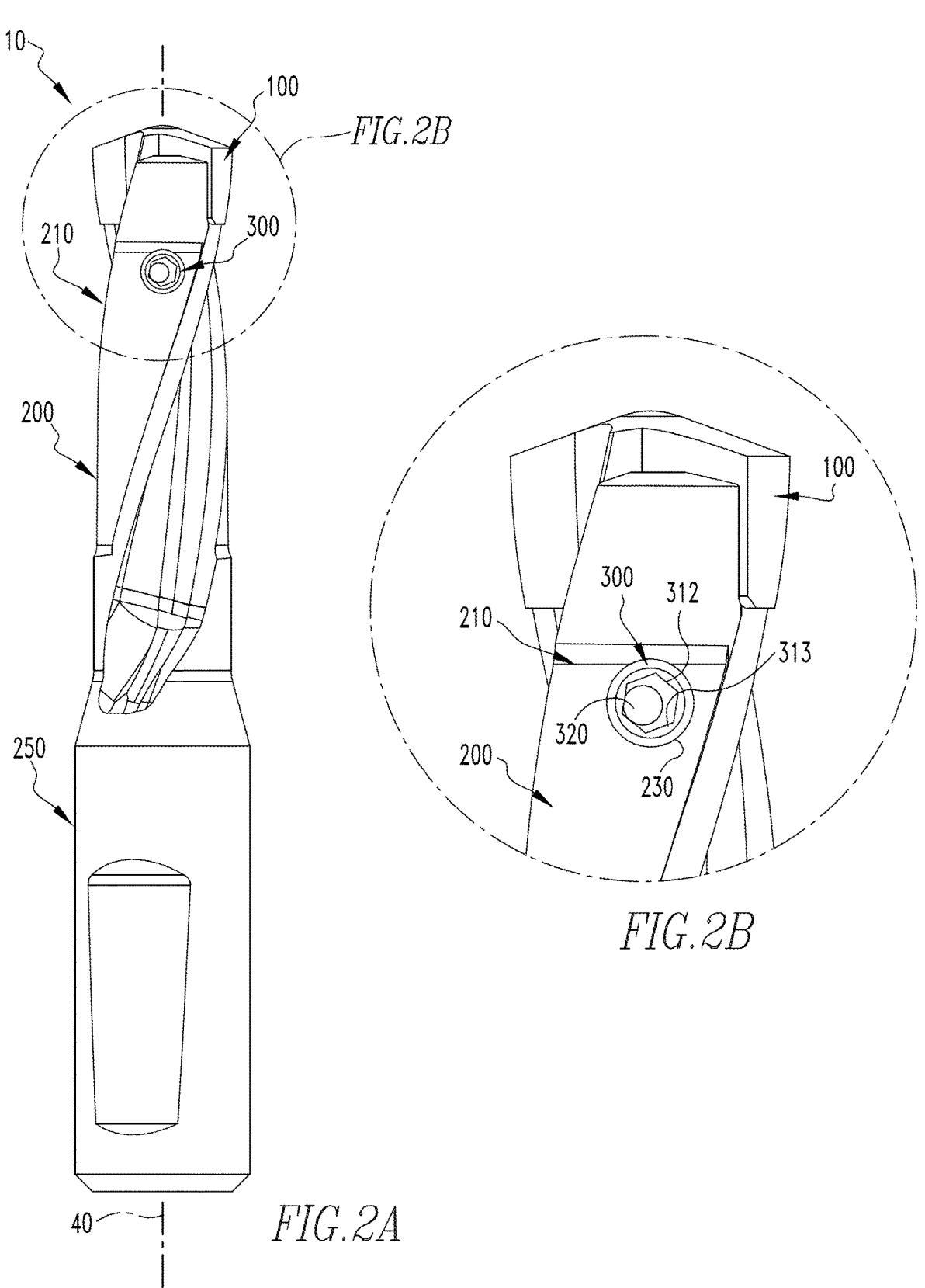
FIGS. 2A and 2B are side views of the modular drill of FIG. 1.
Figure 3:
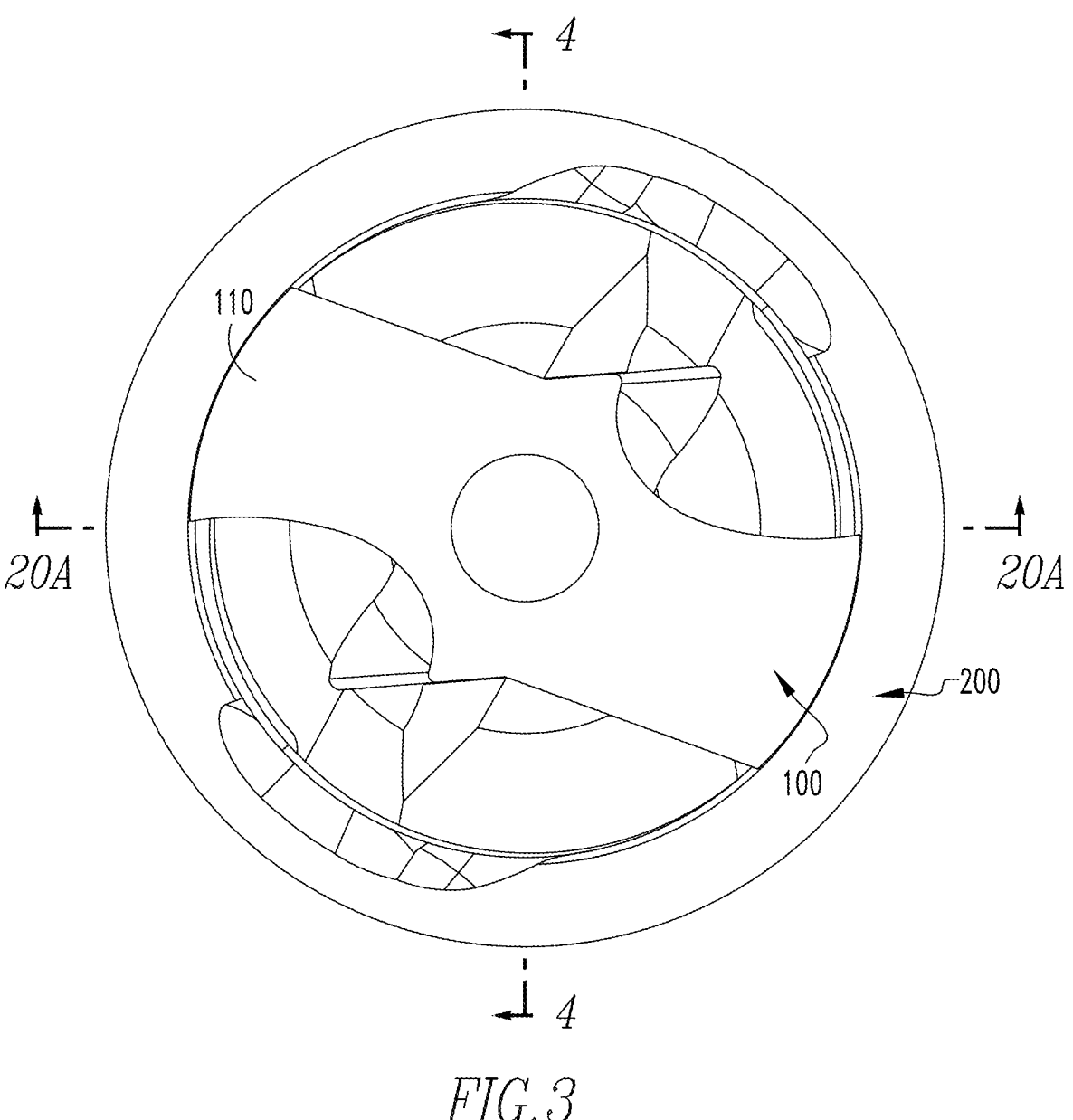
FIG. 3 is a top view of the modular drill of FIG. 1.

As shown in FIGS. 2A and 2B, the cutting head 100 may extend along a rotational axis 40 from a cutting head top surface 110 to a cutting head bottom surface 120. The cutting head 100 may be structured and arranged to rotate clockwise or counter-clockwise around the rotational axis 40. The cutting head 100 may include one or more cutting edges 130 extending radially outward from the cutting head 100 between the top surface 110 and the bottom surface 120.

Figures 19A, 19B:
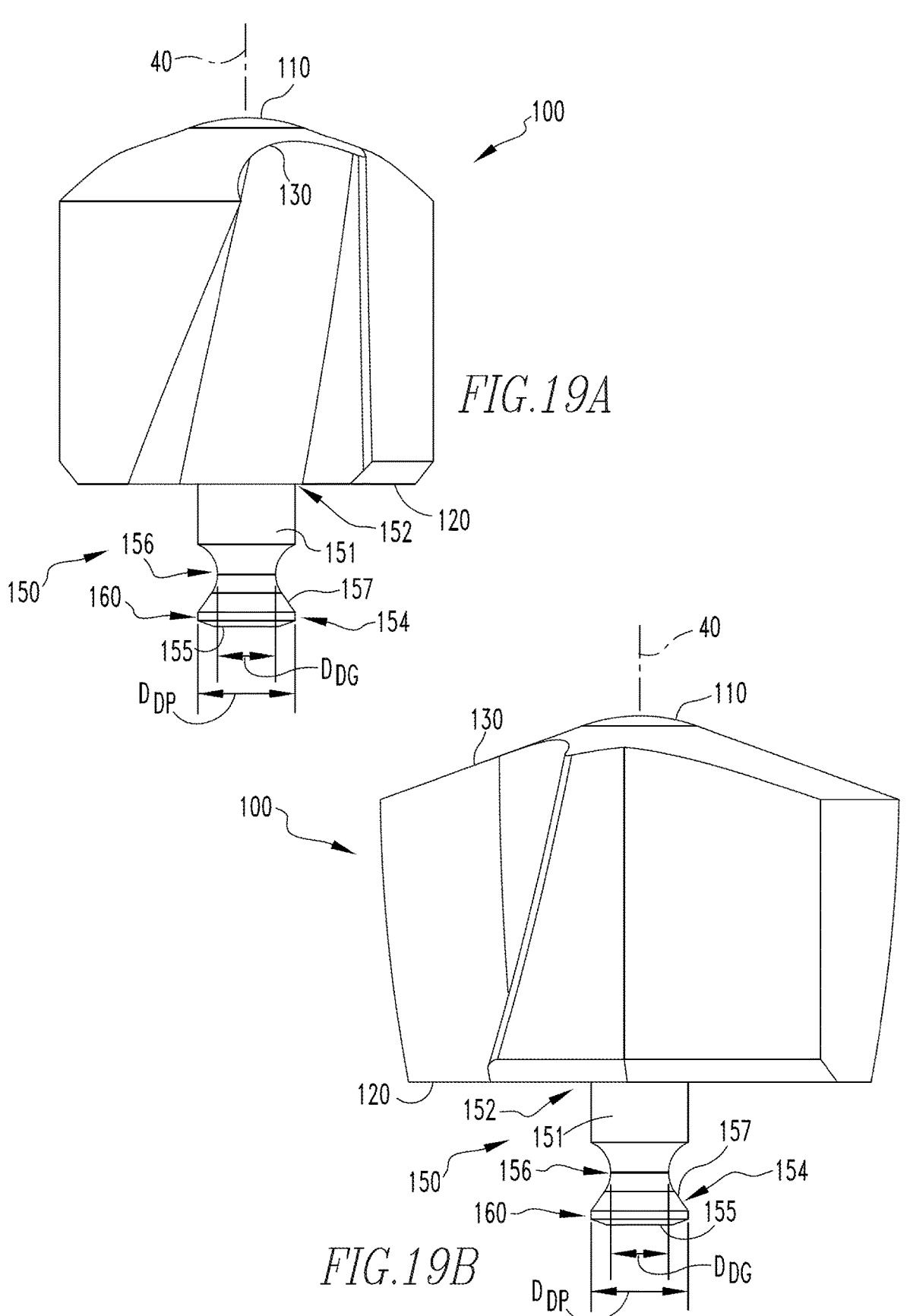
FIGS. 19A and 19B are side views of a cutting head in accordance with an embodiment of the present invention.

The cutting head 100, as shown in FIGS. 19A and 19B, may include a draw pin 150 secured to the bottom surface 120 of the cutting head 100. The draw pin 150 may be releasably secured to the cutting head 100 or permanently secured to the cutting head 100. The draw pin 150 may include a draw pin first end 152 opposite a draw pin second end 154. The draw pin 150 may be cylindrical in shape. The draw pin 150 may be secured to the center of the bottom surface 120. The draw pin 150 may extend perpendicularly from the bottom surface 120 and may extend along the rotational axis 40.

The draw pin first end 152 may be secured to the cutting head 100 by a threaded connection, a clip connection, a weld and/or the like. The draw pin first end 152 may include a threaded connection around the draw pin outer surface 151 of the draw pin first end 152 structured and arranged to connect to the cutting head 100. The draw pin 150 may be structurally integrated into the cutting head 100 such that the draw pin 150 and cutting head 100 form a single solid component.

The draw pin second end 154 may include a draw pin groove 156 around the circumference of the draw pin 150. The draw pin groove 156 may be separated from the draw pin bottom surface 155 of the draw pin second end 154 such that a gap exists between the draw pin groove 156 and the draw pin bottom surface 155. The draw pin groove 156 may extend along a partial length of the circumference of the draw pin 150 or the entire length of the circumference. The draw pin groove 156 may form a curved surface. The draw pin groove 156 may define a draw pin head 160 adjacent the draw pin second end 154. The draw pin head 160 may have a draw pin diameter $D_{DP}$. The draw pin groove 156 may have a draw pin groove diameter $D_{DG}$ that is less than the draw pin diameter $D_{DP}$. The draw pin groove 156 may define a cam follower surface 157 located on the pin head 160 facing the cutting head top surface 110. The cam follower surface 157 may be structured and arranged to follow a cam surface. The cam follower surface 157 may be curved. The cam follower surface 157 may be a flat surface, a concave surface or a convex surface.

Figure 4:
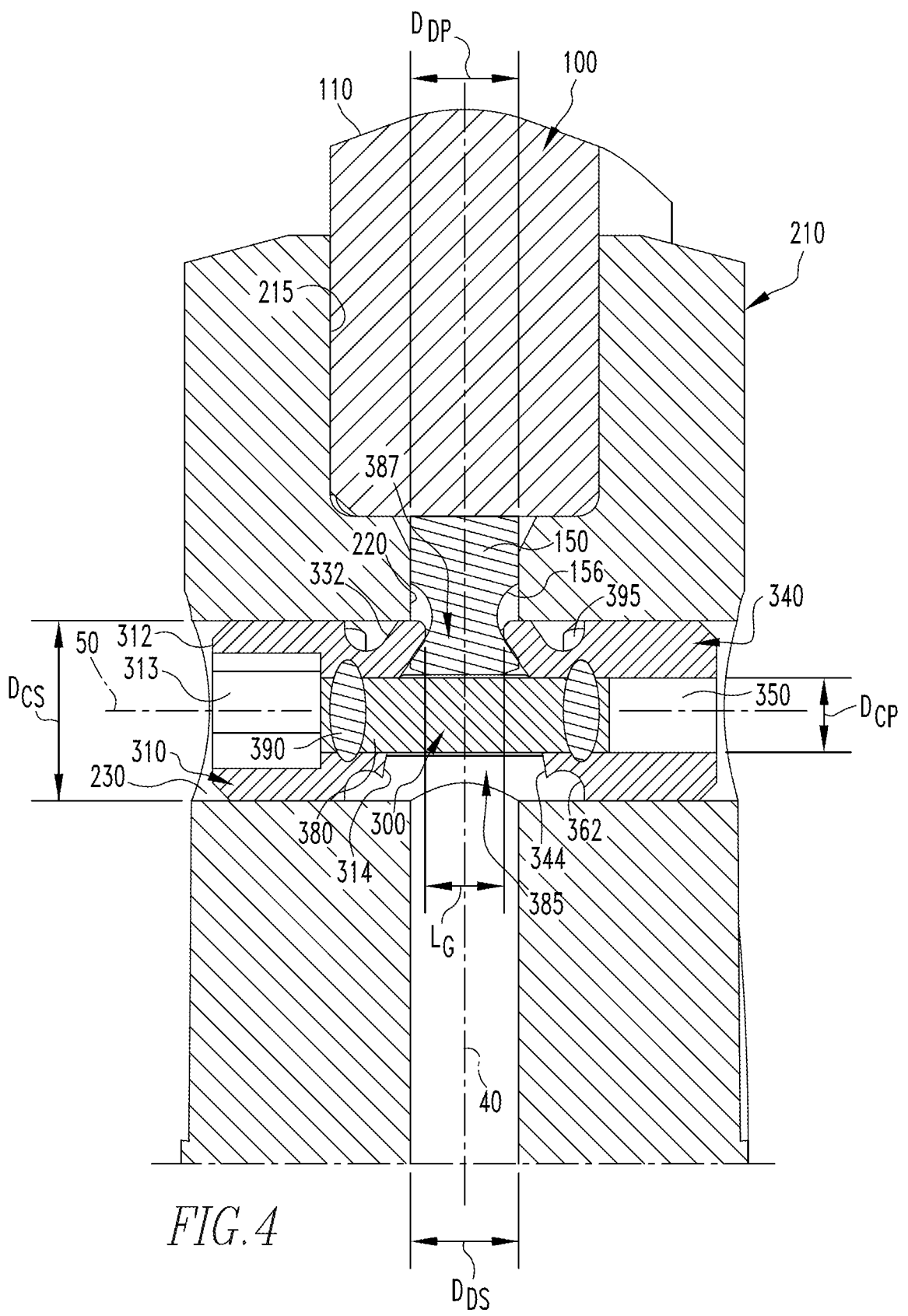
FIG. 4 is a side sectional view of the modular drill of FIG. 1 taken through section 4-4 of FIG. 3.

As shown in FIGS. 2A and 4, the tool shank 200 may extend along the rotational axis 40 from a shank top end 210 to a shank bottom end 250. The tool shank 200 may include a cutting head slot 215 proximate to the shank top end 210, the cutting head slot 215 being structured and arranged to receive the cutting head 100. The cutting head slot 215 may be the same, or about the same, width as the cutting head 100 such that insertion of the cutting head 100 into the cutting head slot 215 results in an interference fit or a friction fit of the cutting head 100. The cutting head slot 215 may extend from the shank top end 210 toward the shank bottom end 250 and may extend parallel to the rotational axis 40.

The tool shank 200 may include a draw pin slot 220 proximate the shank top end 210, the draw pin slot 220 being structured and arranged to receive the draw pin 150 of the cutting head 100. The draw pin slot 220 may have a draw pin slot diameter $D_{DS}$ that is equal to or roughly equal to the draw pin diameter $D_{DP}$ such that insertion of the draw pin 150 into the draw pin slot 220 results in a clearance fit of the draw pin 150. The draw pin slot 220 may extend from the cutting head slot 215 toward the shank bottom end 250 along the rotational axis 40.

The tool shank 200 may include a cam slot 230 proximate the shank top end 210. The cam slot 230 may be structured and arranged to receive a cam, such as the double sided cam 300. The cam slot 230 may extend through the entire width of the tool shank 200 or may extend through a partial length of the tool shank 200. The depth of the cam slot 230 may be equal to or greater than the length of the double sided cam 300. The cam slot 230 may be perpendicular to the draw pin slot 220. The draw pin slot 220 may intersect the cam slot 230.

As shown in FIGS. 5-18, the double sided cam 300 includes a front portion 310 and a rear portion 340. The front portion 310 may be connected to the rear portion 340 by a connecting pin 380. The front portion 310 may be a mirror image of the rear portion 340. The front portion 310 and/or the rear portion 340 may be cylindrical in shape.

Figures 7, 8:
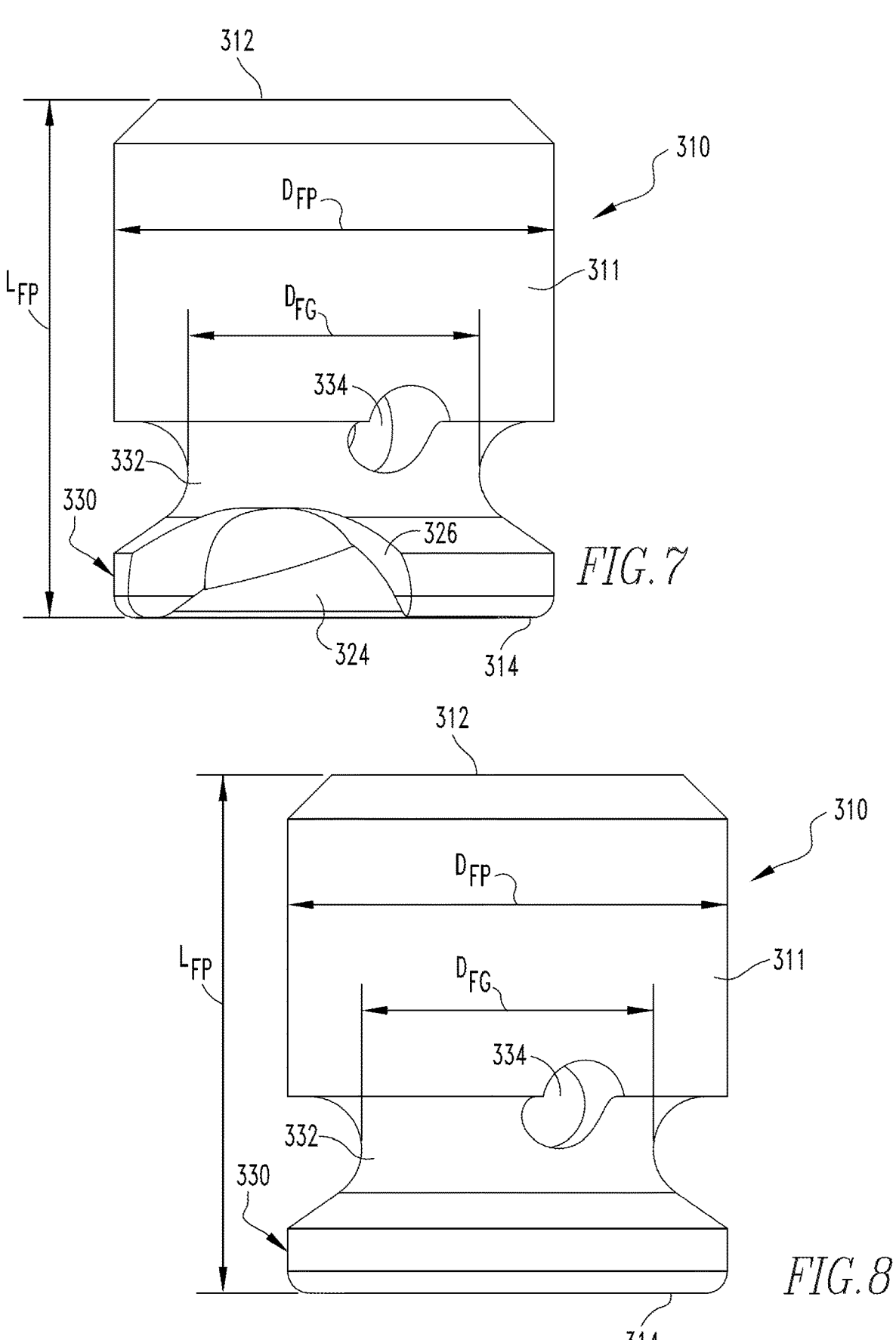
FIG. 7 is a side view of a front portion of a double sided cam in accordance with an embodiment of the present invention.
FIG. 8 is another side view of the front portion of FIG. 7.

As shown in FIGS. 7 and 8, the front portion 310 may have a front portion outer diameter $D_{FP}$. The front portion outer diameter $D_{FP}$ may be less than or equal to the inner diameter $D_{CS}$ of the cam slot 230. The front portion outer diameter $D_{FP}$ may be at least 2 mm, for example, at least 4 mm, or at least 8 mm. The front portion outer diameter $D_{FP}$ may be at most 16 mm, for example, at most 12 mm, or at most 10 mm. The front portion outer diameter $D_{FP}$ may range from 2 mm to 16 mm, for example, from 4 mm to 12 mm, or from 8 mm to 10 mm.

Figures 13, 14:
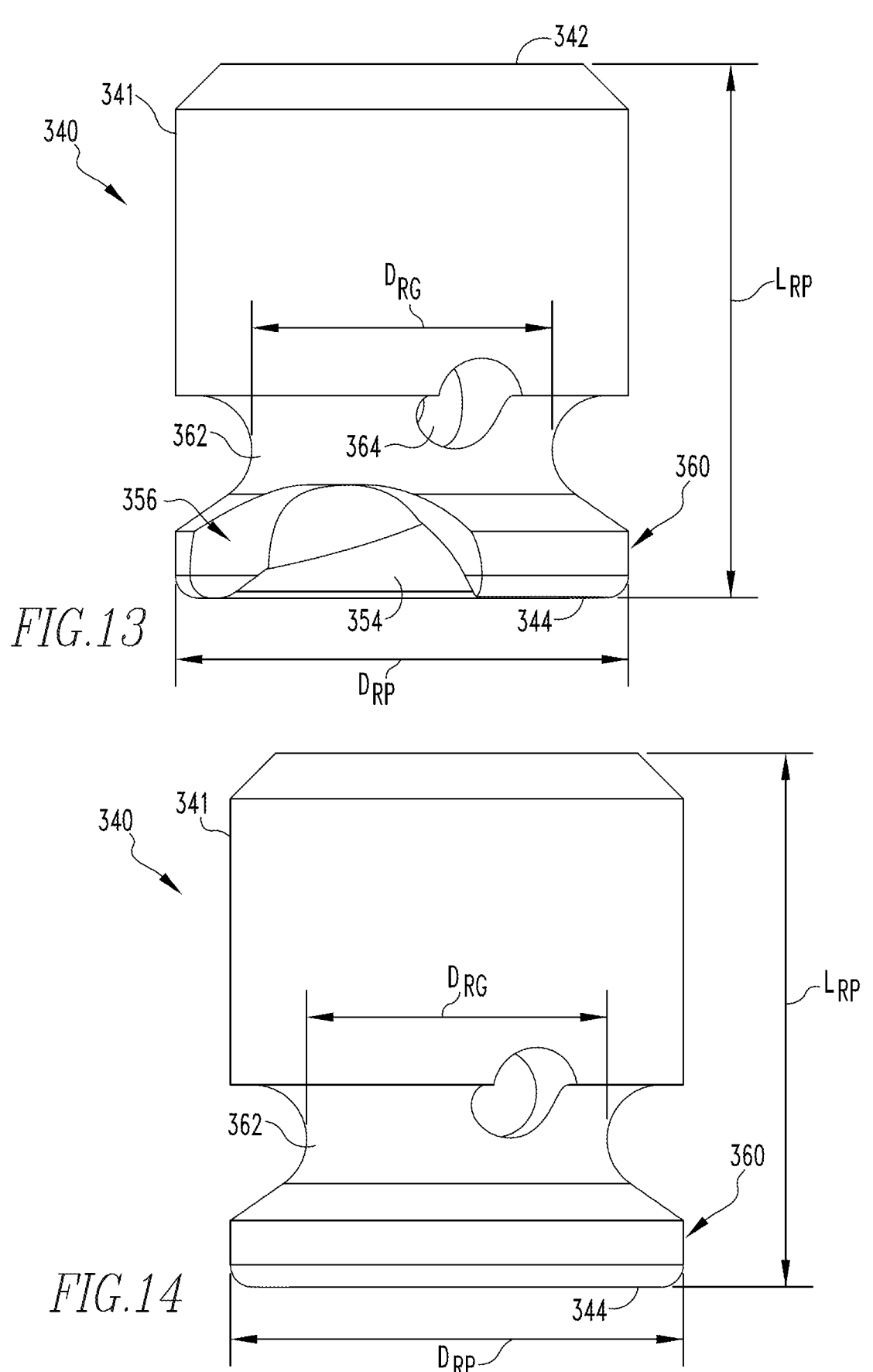
FIG. 13 is a side view of a rear portion of a double sided cam in accordance with an embodiment of the present invention.
FIG. 14 is another side view of the rear portion of FIG. 13.

As show in FIGS. 13 and 14, the rear portion 340 may have a rear portion outer diameter $D_{RP}$. The rear portion outer diameter $D_{RP}$ may be at least 2 mm, for example, at least 4 mm, or at least 8 mm. The rear portion outer diameter $D_{RP}$ may be at most 16 mm, for example, at most 12 mm, or at most 10 mm. The rear portion outer diameter $D_{RP}$ may range from 2 mm to 16 mm, for example, from 4 mm to 12 mm, or from 8 mm to 10 mm.

The front portion 310 includes a front portion top wall 312 separated from a front portion bottom wall 314 along a central axis 50, as shown in FIG. 4. When the double sided cam 300 is installed in the tool shank 200, the central axis 50 may be perpendicular to the rotational axis 40. The front portion top wall 312 and/or the front portion bottom wall 314 may include beveled, chamfered or curved edges around the outside diameter of the front portion 310.

The front portion length $L_{FP}$, measured as the distance from the front portion top wall 312 to the front portion bottom wall 314, may be at least 3 mm, for example, at least 6 mm, or at least 9 mm. The front portion length $L_{FP}$ may be at most 16 mm, for example, at most 14 mm, or at most 12 mm. The front portion length $L_{FP}$ may range from 3 mm to 16 mm, for example, from 6 mm to 14 mm, or from 9 mm to 12 mm.

Figure 9:
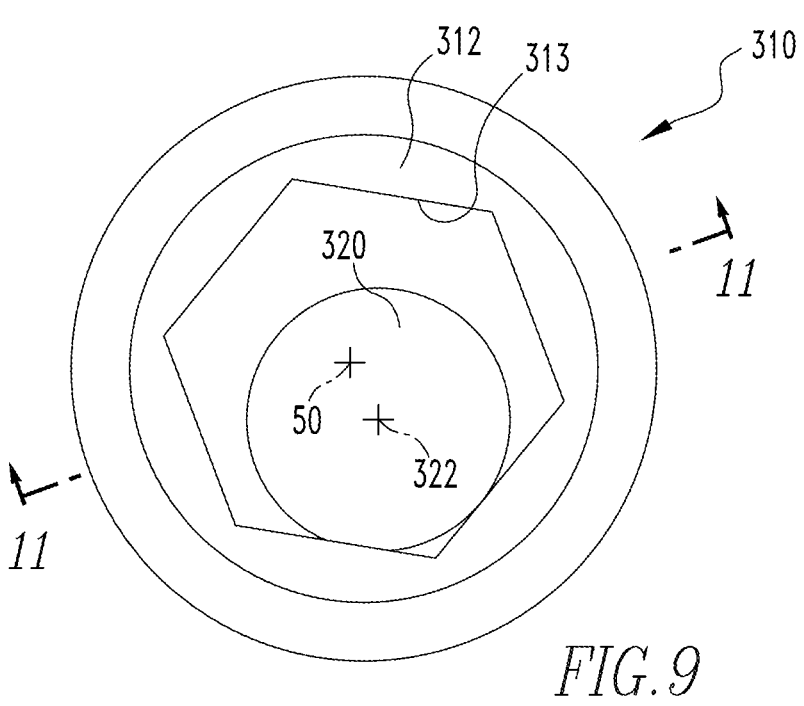
FIG. 9 is a top view of the front portion of FIG. 7.

As shown in FIG. 9, the front portion 310 may include a front recess 313 extending from the front portion top wall 312 toward the front portion bottom wall 314. The front recess 313 may be structured and arranged to receive a rotation tool [not shown] such that rotation of the rotation tool applies a force on the front portion 310, resulting in a rotation of the front portion 310. The front portion 310 may be rotated about the central axis 50. The front recess 313 may be hex shaped, cross shaped, square shaped, star shaped, triangular shaped, line shaped and/or the like. In some non-limiting embodiments or aspects, the front portion top wall 312 may be flat, convex shaped or concave shaped.

Figure 10:
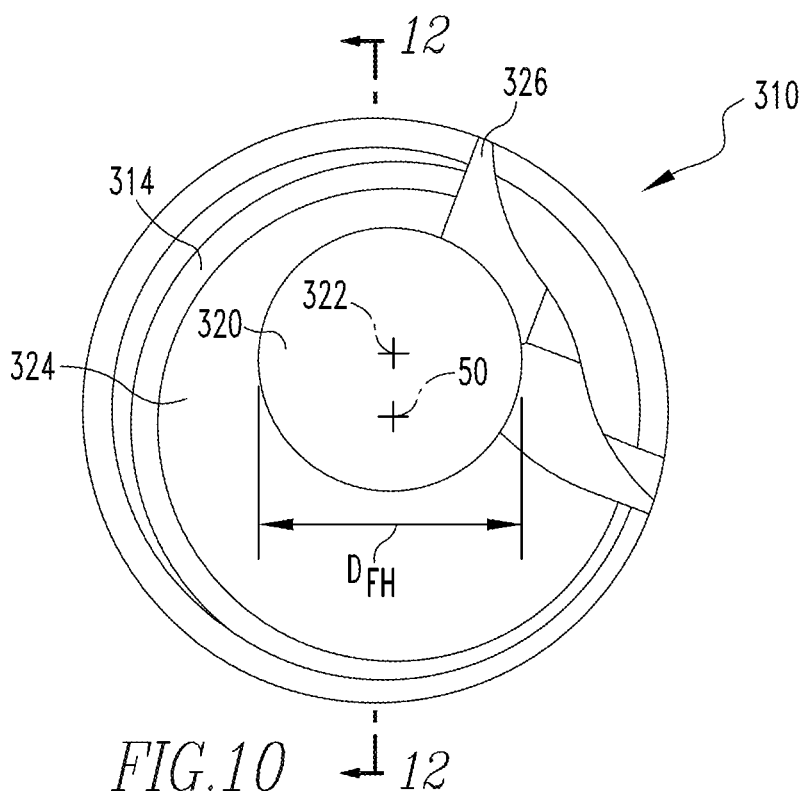
FIG. 10 is a bottom view of the front portion of FIG. 7.

The front portion 310 includes a front portion hole 320 extending from the front portion bottom wall 314 in a direction parallel to the central axis 50. The front portion hole 320 may extend through the entire length of the front portion 310 parallel to the central axis 50. The front portion hole 320 has a front hole diameter $D_{FH}$, as shown in FIG. 10, that may be at least 0.5 mm, for example, at least 1 mm, or at least 2 mm. The front hole diameter $D_{FH}$ may be at most 8 mm, for example, at most 6 mm, or at most 4 mm. The front hole diameter $D_{FH}$ may range from 0.5 mm to 8 mm, for example, from 1 mm to 6 mm, or from 2 mm to 4 mm.

As shown in FIGS. 9 and 10, the front portion hole 320 may have a front hole center 322 that is located radially outward from the central axis 50 (e.g., centered along an axis offset from the central axis 50). The front hole center 322 may be located such that the entire outer circumference of the front portion hole 320 lies within the front portion 310. The front hole center 322 may be located at a distance equal to at least half of the front hole diameter $D_{FH}$ radially inward from the front portion outer surface 311.

The front portion 310 includes a front securing portion 330 adjacent the bottom wall 314 structured and arranged to secure the draw pin 150 to the tool shank 200. The front securing portion 330 may include a front portion groove 332 with a front portion groove diameter $D_{FG}$. The front portion groove diameter $D_{FG}$ may be less than the front portion outer diameter $D_{FP}$. The front portion groove 332 may extend around the entire circumference of the front portion 310.

The front portion groove 332 may allow for flexibility of the front portion 310. The front portion groove 332 may allow the front securing portion 330 to elastically deform while installed in the tool shank 200, reducing the stiffness of the front portion 310. The front portion groove 332 may allow the front securing portion 330 to deform in the axial and radial directions from the central axis 50 when a force is applied to the front securing portion 330, such as a force from the draw pin 150. The increased flexibility from the front portion groove 332 may reduce sensitivity of the double sided cam 300 to positional variations.

Figure 11:
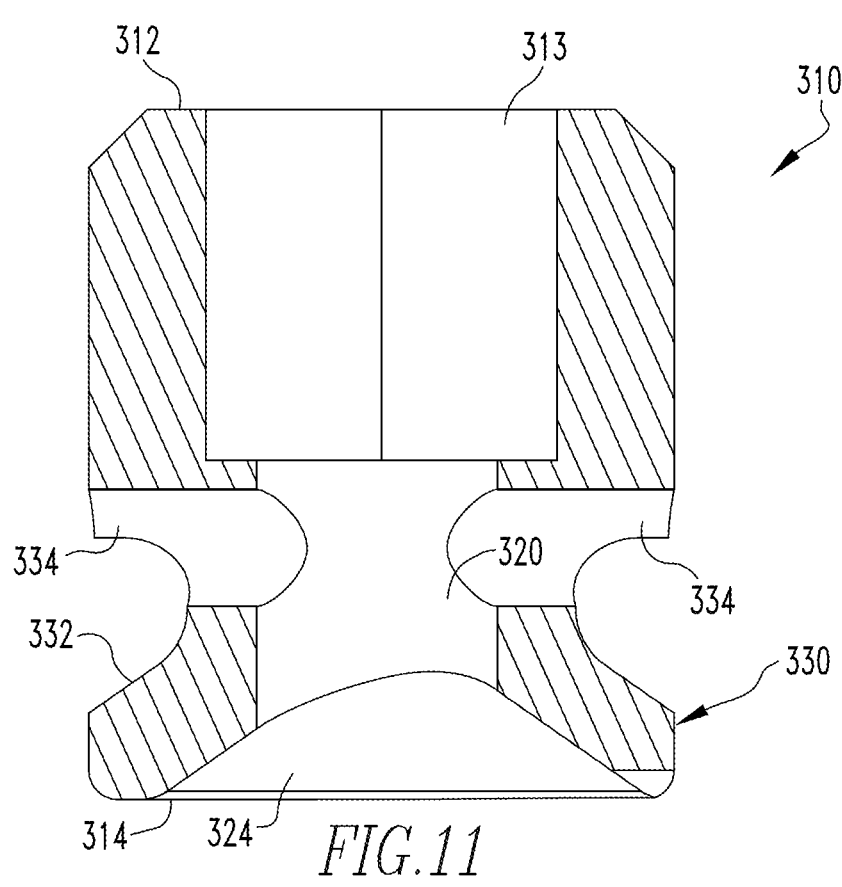
FIG. 11 is a side sectional view of the front portion of FIG. 7 taken through section 11-11 of FIG. 9.
Figure 12:
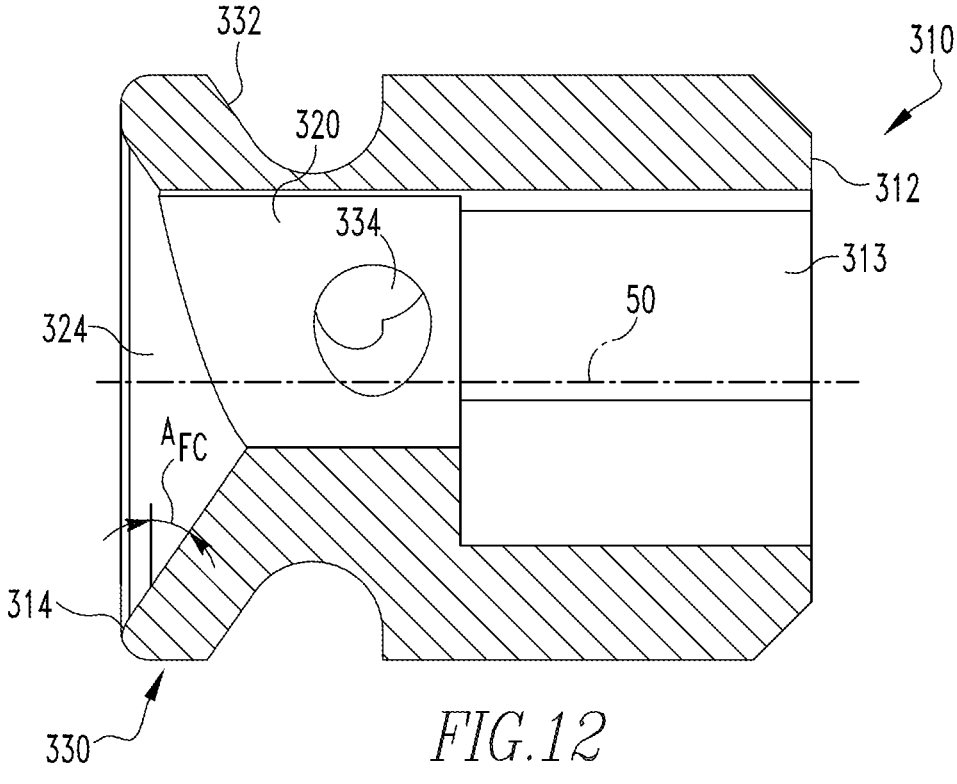
FIG. 12 is a side sectional view of the front portion of FIG. 7 taken through section 12-12 of FIG. 10.

As shown in FIGS. 11 and 12, at least a portion of the front portion groove 332 may intersect with a front securing slot 334. The front securing slot 334 may be structured and arranged to receive a front securing pin 390. The front securing slot 334 may be circular in shape. The front securing slot 334 may extend through the entire front portion 310. The front securing slot 334 may intersect the central axis 50.

The front securing pin 390 may be cylindrical in shape and may be structured and arranged to fit within the front securing slot 334. The front securing pin 390 may have a front securing pin length $L_{FS}$ that is greater than or equal to the front portion groove diameter $D_{FG}$. The front securing pin length $L_{FS}$ may be less than or equal to the front portion outer diameter $D_{FP}$.

As shown in FIG. 10, the front portion 310 may include a front portion cam surface 324. The front portion cam surface 324 may be a conical surface such that the vertex of the front portion cam surface 324 is located on an axis parallel to and offset from the central axis 50. The front portion cam surface 324 extends along an axis parallel to the central axis 50 from the front portion bottom wall 314 toward the front portion top wall 312. The front portion cam surface 324 may extend at a front cam angle $A_{FC}$. The front cam angle $A_{FC}$ may be at least 15°, for example, at least 30°, or at least 40°. The front cam angle $A_{FC}$ may be at most 65°, for example, at most 50°, or at most 45°. The front cam angle $A_{FC}$ may range from 15° to 65°, for example from 30 to 50°, or from 40° to 45°.

The front portion 310 may include a front clearance notch 326. The front clearance notch 326 may be formed by a 90° cut or a square cut. The corner of the square cut of the front clearance notch 326 may be located at the central axis 50. The front clearance notch 326 may intersect with at least 60° of the outer circumference of the front portion rear wall, for example, at least 75° or at least 90°. The front clearance notch 326 may intersect with at most 120° of the outer circumference of the front portion bottom wall 314, for example, at most 105° or at most 90°. The front clearance notch 326 may be structured and arranged to receive the draw pin 150. The front clearance notch 326 may extend from an outer diameter of the front portion 310 toward the central axis 50. The front clearance notch 326 may extend in the radial direction from the outer diameter of the front portion 310 toward the central axis 50. The front clearance notch 326 may extend in the radial direction to the outer diameter of the front portion groove 332. The front clearance notch 326 may extend in the axial direction from the front portion bottom wall 314 to the front portion groove 332.

The rear portion 340 includes a rear portion top wall 342 separated from a rear portion bottom wall 344 along a central axis 50. When the double sided cam 300 is installed in the tool shank 200, the central axis 50 of the rear portion 340 and the front portion 310 are aligned, as shown in FIG. 4. The rear portion top wall 342 and/or the rear portion bottom wall 344 may include beveled, chamfered or curved edges around the outside diameter of rear portion 340.

The rear portion length $L_{RP}$, measured as the distance from the rear portion top wall 342 to the rear portion bottom wall 344, may be at least 3 mm, for example, at least 6 mm, or at least 9 mm. The rear portion length $L_{RP}$ may be at most 16 mm, for example, at most 14 mm, or at most 12 mm. The rear portion length $L_{RP}$ may range 3 mm to 16 mm, for example, from 6 mm to 14 mm, or from 9 mm to 12 mm.

The rear portion 340 may include a rear recess similar to the front recess 313 extending from the rear portion top wall 342 toward the rear portion bottom wall 344. The rear recess may be structured and arranged to receive a rotation tool such that rotation of the rotation tool applies a force on the rear portion 340, resulting in a rotation of the rear portion 340. The rear portion 340 may be rotated about the central axis 50. The rear recess may be hex shaped, cross shaped, square shaped, star shaped, triangular shaped, line shaped and/or the like. In some non-limiting embodiments or aspects, the rear portion top wall 342 may be flat, convex shaped or concave shaped.

Figure 16:
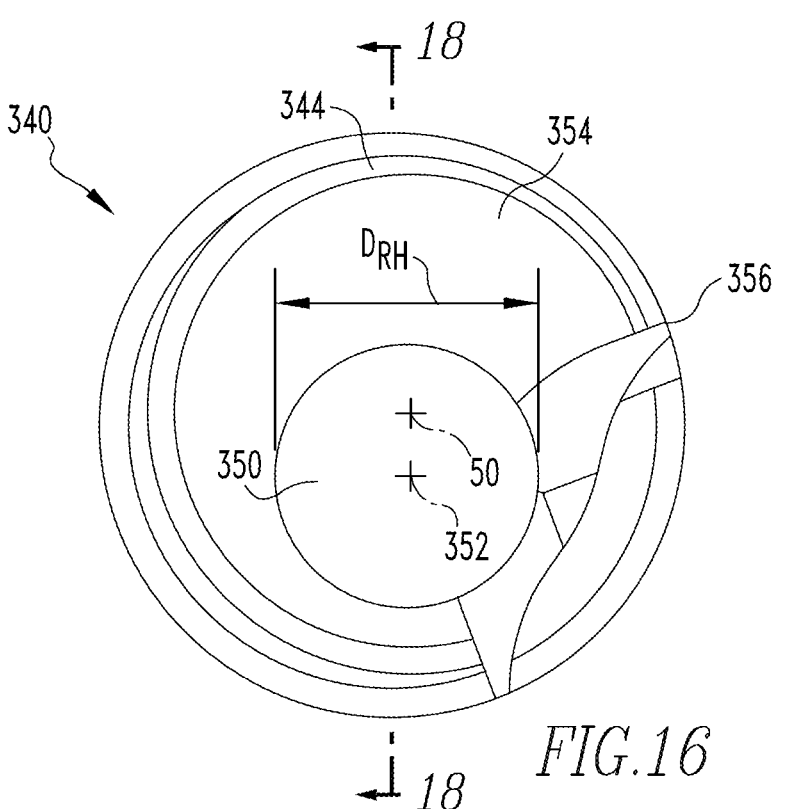
FIG. 16 is a bottom view of the rear portion of FIG. 13.

The rear portion 340 includes a rear portion hole 350 extending from the rear portion bottom wall 344 in a direction parallel to the central axis 50. The rear portion hole 350 may extend through the entire length of the rear portion 340 along the central axis 50. The rear portion hole 350 has a rear hole diameter $D_{RH}$, as shown in FIG. 16, that may be at least 0.5 mm, for example, at least 1 mm, or at least 2 mm. The rear hole diameter $D_{RH}$ may be at most 8 mm, for example, at most 6 mm, or at most 4 mm. The rear hole diameter $D_{RH}$ may range from 0.5 mm to 8 mm, for example, from 1 mm to 6 mm, or from 2 mm to 4 mm. The rear hole diameter $D_{RH}$ may be equal to the front hole diameter $D_{FH}$.

Figure 15:
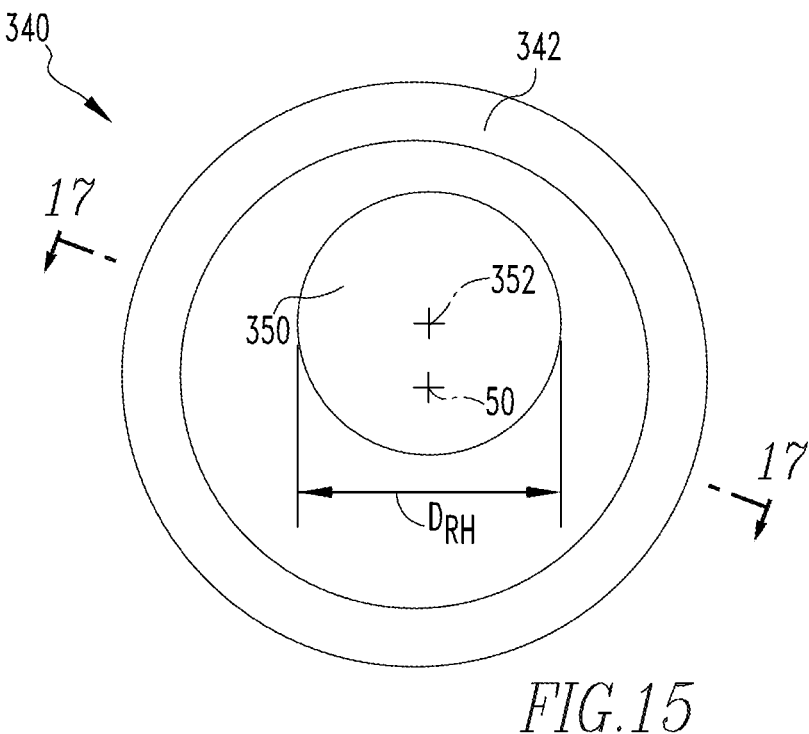
FIG. 15 is a top view of the rear portion of FIG. 13.

The rear portion hole 350 may have a rear hole center 352 that is located radially outward from the central axis 50, as shown in FIGS. 15 and 16. The rear hole center 352 may be located such that the entire outer circumference of the rear portion hole 350 lies within the rear portion 340. The rear hole center 352 may be located at a distance equal to at least half of the rear hole diameter $D_{RH}$ radially inward from the rear portion outer surface 341.

The rear portion 340 includes a rear securing portion 360 adjacent the rear bottom wall 344 structured and arranged to secure the draw pin 150 into the tool shank 200. The rear securing portion 360 may include a rear portion groove 362 with a rear portion groove diameter $D_{RG}$. The rear portion groove diameter $D_{RG}$ may be less than the rear portion outer diameter $D_{RP}$. The rear portion groove 362 may extend around the entire circumference of the rear portion 340.

The rear portion groove 362 may allow for flexibility of the rear portion 340. The rear portion groove 362 may allow the rear securing portion 360 to elastically deform while installed in the tool shank 200, reducing the stiffness of the rear portion 340. The rear portion groove 362 may allow the rear securing portion 360 to deform in the axial and radial directions from the central axis 50 when a force is applied to the rear securing portion 360, such as a force from the draw pin 150. The increased flexibility from the rear portion groove 362 may reduce sensitivity of the double sided cam 300 to positional variations.

Figure 17:
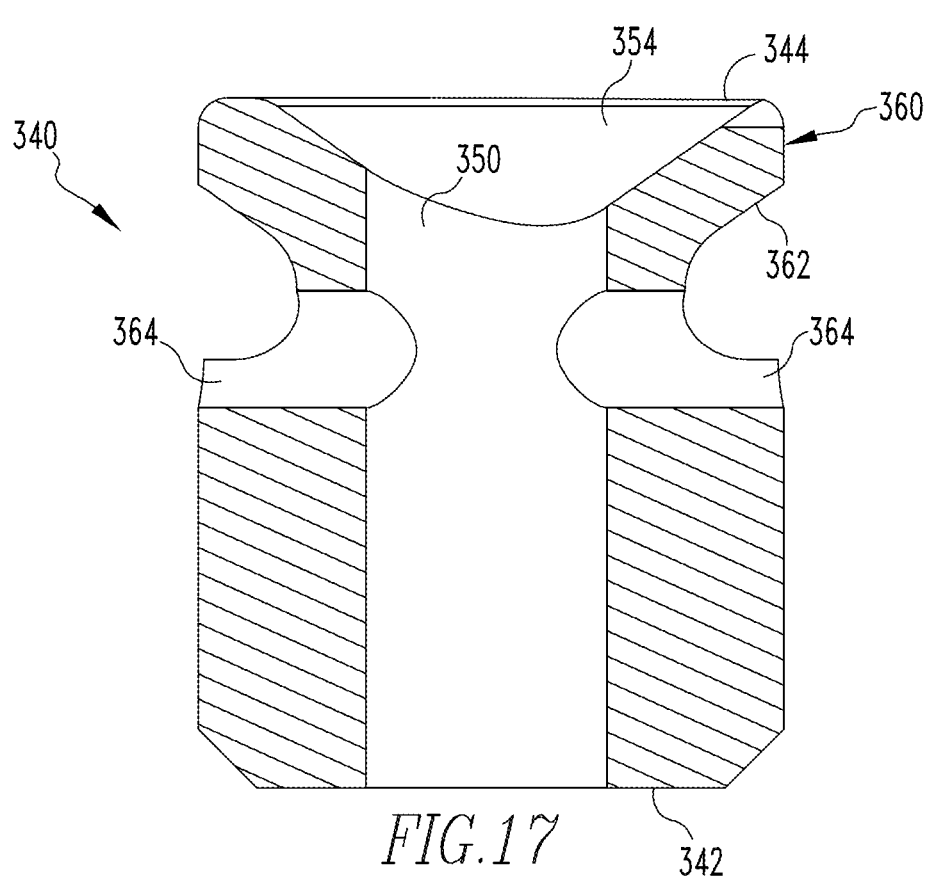
FIG. 17 is a side sectional view of the rear portion of FIG. 13 taken through section 17-17 of FIG. 15.
Figure 18:
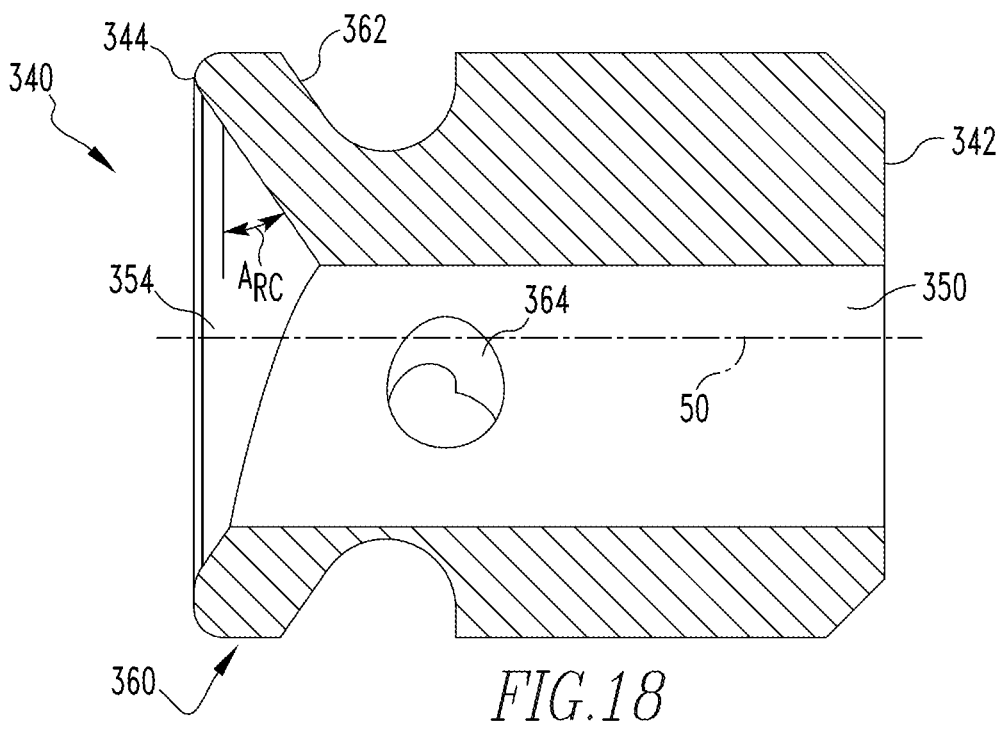
FIG. 18 is a side sectional view of the rear portion of FIG. 13 taken through section 18-18 of FIG. 16.

As shown in FIGS. 17 and 18, at least a portion of the rear portion groove 362 may intersect with a rear securing slot 364. The rear securing slot 364 may be structured and arranged to receive the rear securing pin 395. The rear securing slot 364 may be circular in shape. The rear securing slot 364 may extend through the diameter of the rear portion 340. The rear securing slot 364 may intersect the central axis 50.

The rear securing pin 395 may be cylindrical in shape and may be structured and arranged to fit within the rear securing slot 364. The rear securing pin 395 may have a rear securing pin length $L_{RS}$ that is greater than or equal to the rear portion groove diameter $D_{RG}$.

The rear portion 340 may include a rear portion cam surface 354. The rear portion cam surface 354 may be a conical surface such that the vertex of the rear portion cam surface 354 is located on an axis parallel to and offset from the central axis 50. The rear portion cam surface 354 extends along an axis parallel to the central axis 50 from the rear portion bottom wall 344 toward the rear portion top wall 342. The rear portion cam surface 354 may extend at a rear cam angle $A_{RC}$, as shown in FIG. 18. The rear cam angle $A_{RC}$ may be at least 15°, for example, at least 30°, or at least 40°. The rear cam angle $A_{RC}$ may be at most 65°, for example, at most 50°, or at most 45°. The rear cam angle $A_{RC}$ may range from 15° to 65°, for example from 30° to 50°, or from 40° to 45°. The rear cam angle $A_{RC}$ may be equal to the front cam angle $A_{FC}$.

The rear portion 340 may include a rear clearance notch 356. The rear clearance notch 356 may be formed by a 90° cut or a square cut. The corner of the square cut of the rear clearance notch 356 may be located at the central axis 50. The rear clearance notch 356 may intersect with at least 60° of the outer circumference of the rear portion bottom wall 344, for example, at least 75° or at least 90°. The rear clearance notch 356 may intersect with at most 120° of the outer circumference of the rear portion bottom wall 344, for example, at most 105° or at most 90°. The rear clearance notch 356 may intersect the same portion of the rear portion bottom wall 344 as the portion the front clearance notch 326 intersects with the front portion bottom wall 314. The rear clearance notch 356 may be structured and arranged to receive the draw pin 150. The rear clearance notch 356 may extend from an outer diameter of the rear portion 340 extending toward the central axis 50. The rear clearance notch 356 may extend in the radial direction from the outer diameter of the rear portion 340 toward the central axis 50. The rear clearance notch 356 may extend in the radial direction to the outer diameter of the rear portion groove 362. The rear clearance notch 356 may extend in the axial direction from the rear portion bottom wall 344 to the rear portion groove 362.

Figure 5:
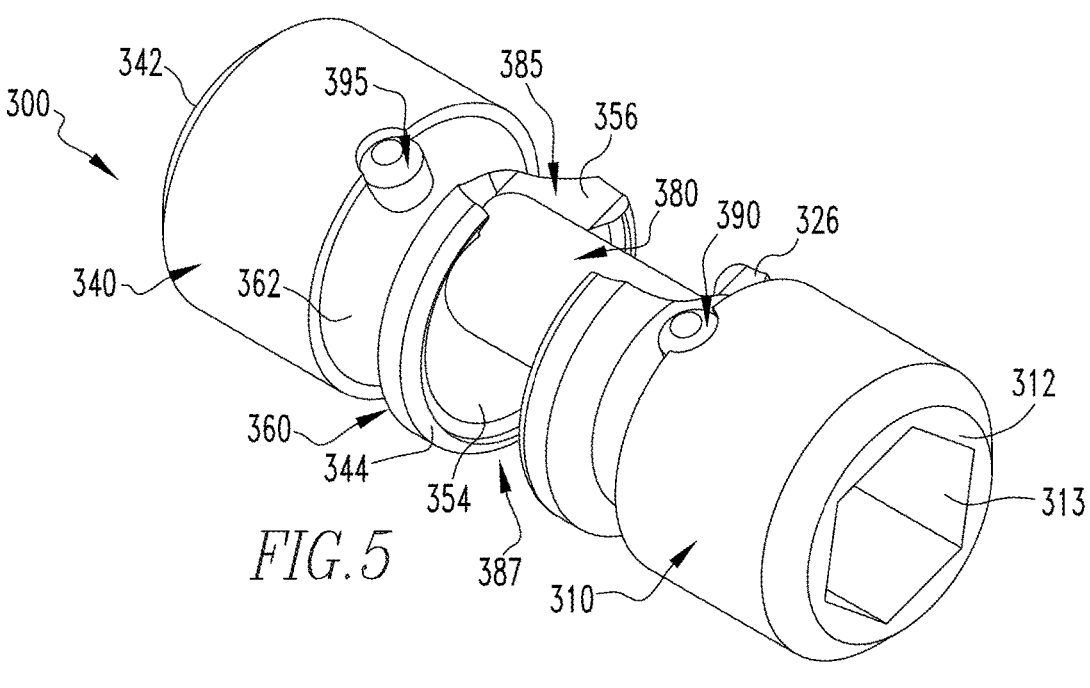
FIG. 5 is an isometric view of a double sided cam in accordance with an embodiment of the present invention.
Figure 6:
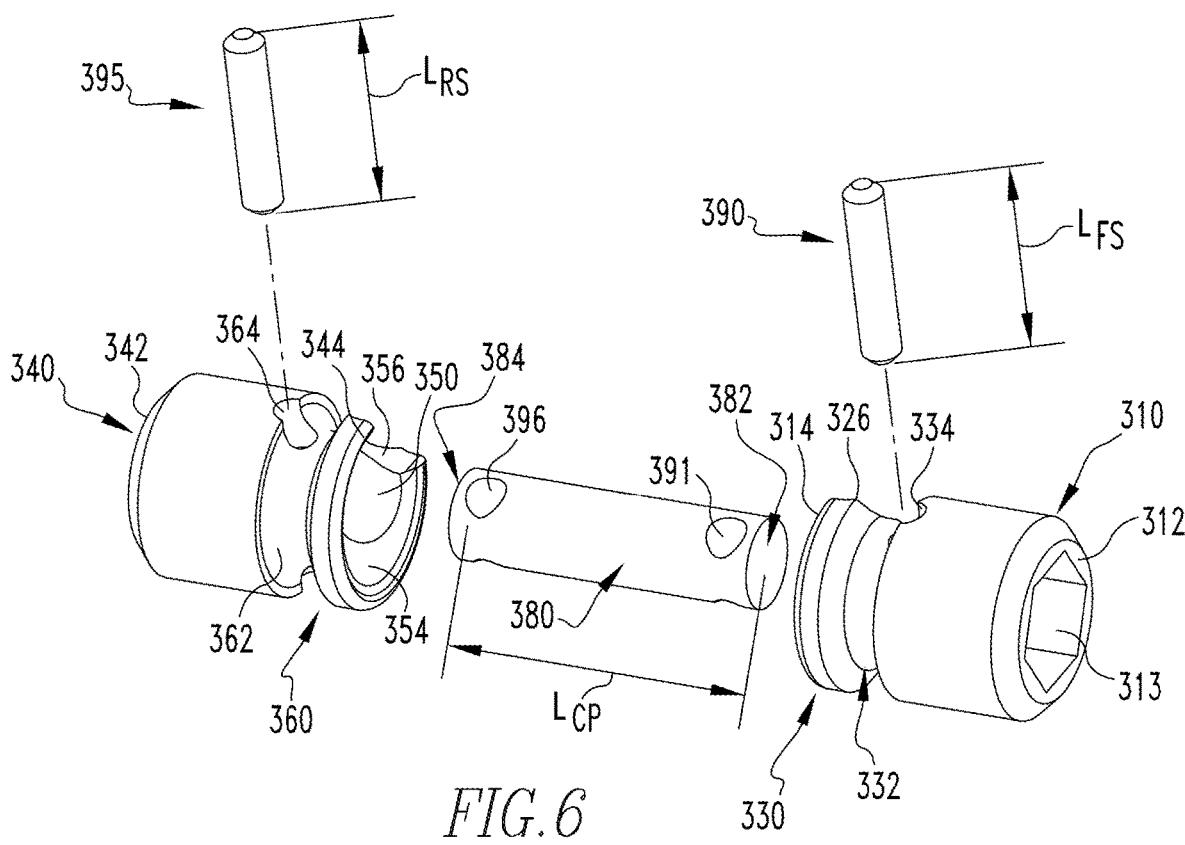
FIG. 6 is an exploded view of the double sided cam of FIG. 5.

As shown in FIGS. 5 and 6, the front portion 310 and rear portion 340 may be connected to each other with a connecting pin 380. The connecting pin 380 may be cylindrical in shape, and may extend from a connecting pin front end 382 to a connecting pin back end 384. The connecting pin may have a connecting pin diameter $D_{CP}$ that is equal to or less than the front hole diameter $D_{FH}$ and/or the rear hole diameter $D_{RH}$. The connecting pin 380 may have a connecting pin length $L_{CP}$, the connecting pin length $L_{CP}$ being at least 3 mm, for example, at least 9 mm, or at least 12 mm. The connecting pin length $L_{CP}$ may be at most 30 mm, for example, at most 24 mm, or at most 18 mm. The connecting pin length $L_{CP}$ may range from 3 mm to 30 mm, for example, from 9 mm to 24 mm, or from 12 mm to 18 mm.

The connecting pin 380 may be secured to the front portion 310 by a front securing pin 390. The connecting pin 380 may include a front opening 391 structured and arranged to receive the front securing pin 390. The front opening 391 may be proximate to the connecting pin front end 382. The front opening 391 may extend through the connecting pin 380 along an axis offset from the center of the connecting pin. The front opening 391 may extend through the entire diameter of the connecting pin 380. The front securing pin 390 may have a front securing pin length $L_{FS}$ that is equal to or less than the front portion outer diameter $D_{PP}$. The front securing pin length $L_{FS}$ may be less than, equal to or greater than the front portion groove diameter $D_{FG}$.

The connecting pin 380 may be secured to the rear portion 340 by a rear securing pin 395. The connecting pin 380 may include a rear opening 396 structured and arranged to receive the rear securing pin 395. The rear opening 396 may be proximate to the connecting pin back end 384. The rear opening 396 may extend through the connecting pin 380 along an axis offset from the center of the connecting pin. The rear opening 396 may extend through the entire diameter of the connecting pin 380. The rear securing pin 395 may have a rear securing pin length $L_{RS}$ that is equal to or less than the rear portion outer diameter $D_{RP}$. The rear securing pin length $L_{RS}$ may be less than, equal to, or greater than the rear portion groove diameter $D_{RG}$. The rear securing pin length $L_{RS}$ may be equal to the front securing pin length $L_{FS}$.

The front portion 310, rear portion 340, connecting pin 380, front securing pin 390 and rear securing pin 395 may be made of any suitable material, including metals such as steel, or other suitable materials such as aluminum, plastic, and the like.

Although the front portion 310, rear portion 340, connecting pin 380, front securing pin 390 and rear securing pin 395 are shown as separate components in FIGS. 4-18 and 20A-22B, it should be understood that the components could alternatively be integrally formed. In some non-limiting embodiments or aspects, the connecting pin 380, front portion 310, and rear portion 340 may form an individual or integral component. The individual or integral component may be formed by casting, machining, sintering, additive manufacturing, molding or other method of manufacturing.

When the front portion 310 is connected to the rear portion 340, the front clearance notch 326 may align with the rear clearance notch 356. The front clearance notch 326 and the rear clearance notch 356 may form a draw pin cam slot 385. The draw pin cam slot 385 may have an opening that is greater than the draw pin diameter $D_{DP}$.

When the front portion 310 is connected to the rear portion 340, the front portion 310 may be separated from the rear portion 340 by a gap 387. The gap length LG may be shorter than the draw pin diameter $D_{DP}$. The gap length LG may be longer than the draw pin groove diameter $D_{DG}$.

Figure 20A:
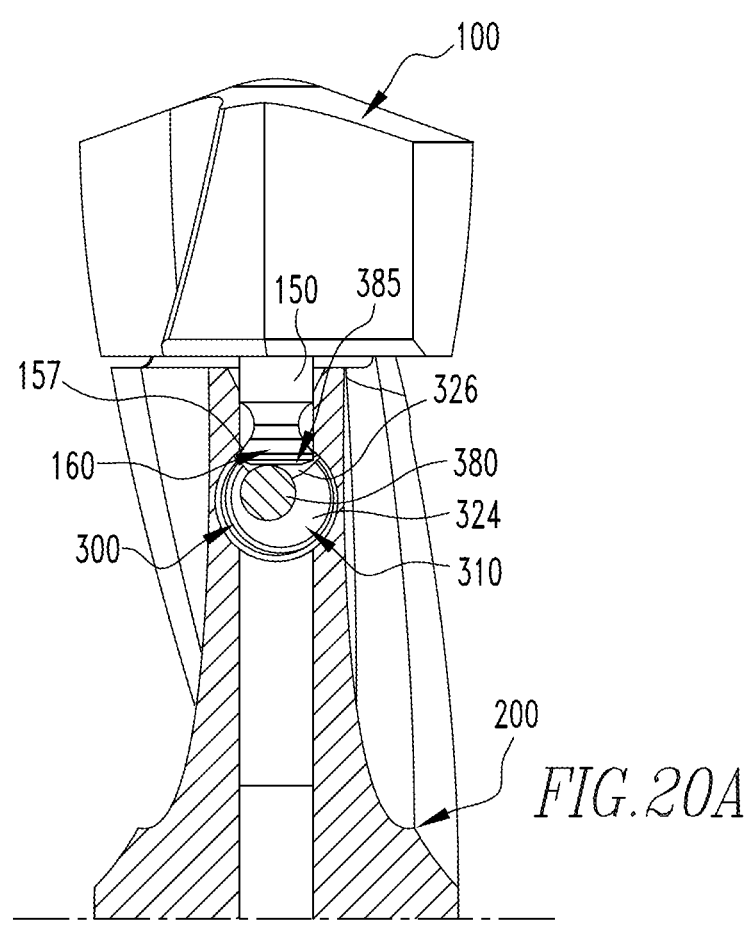
FIG. 20A is a partial cross-sectional view of the modular drill of FIG. 1 taken through section 20A-20A of FIG. 3 in the unlocked position.
Figure 20B:
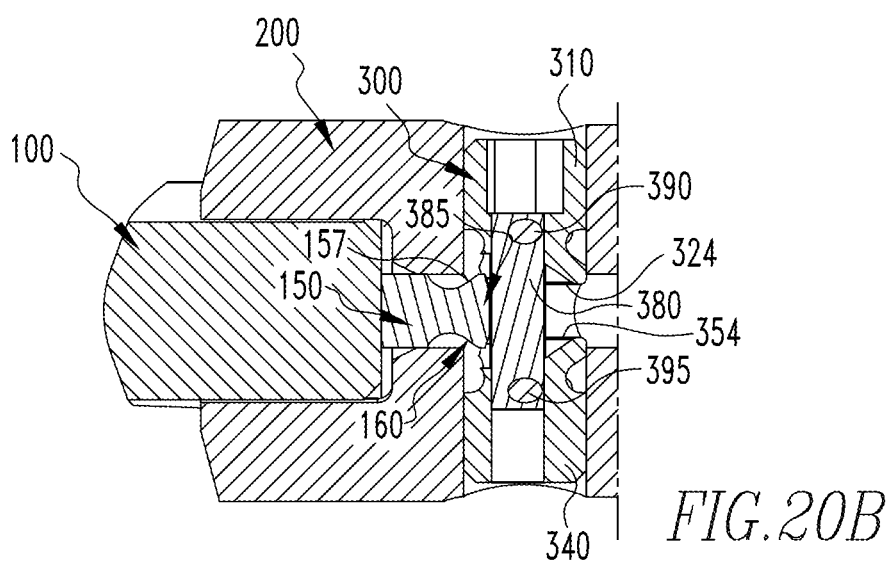
FIG. 20B is a cross-sectional view of the modular drill of FIG. 1 taken through section 4-4 of FIG. 3 in the unlocked position.

The draw pin 150 may be secured by the double sided cam 300 into the tool shank 200. FIGS. 20A and 20B show the unlocked position of the double sided cam 300. The draw pin head 160 may be inserted into the draw pin cam slot 385 such that the draw pin groove 156 is aligned with the front clearance notch 326 and rear clearance notch 356. In the unlocked position, the draw pin cam slot 385 may be located in a position aligned with the rotational axis facing the cutting head 100. The draw pin head 160 may come in contact with the connecting pin 380. The connecting pin 380 may ensure that the draw pin groove 156 aligns with the clearance notches 326, 356 by preventing the draw pin 150 from moving too far in a direction parallel to the rotational axis 40.

Figure 21A:
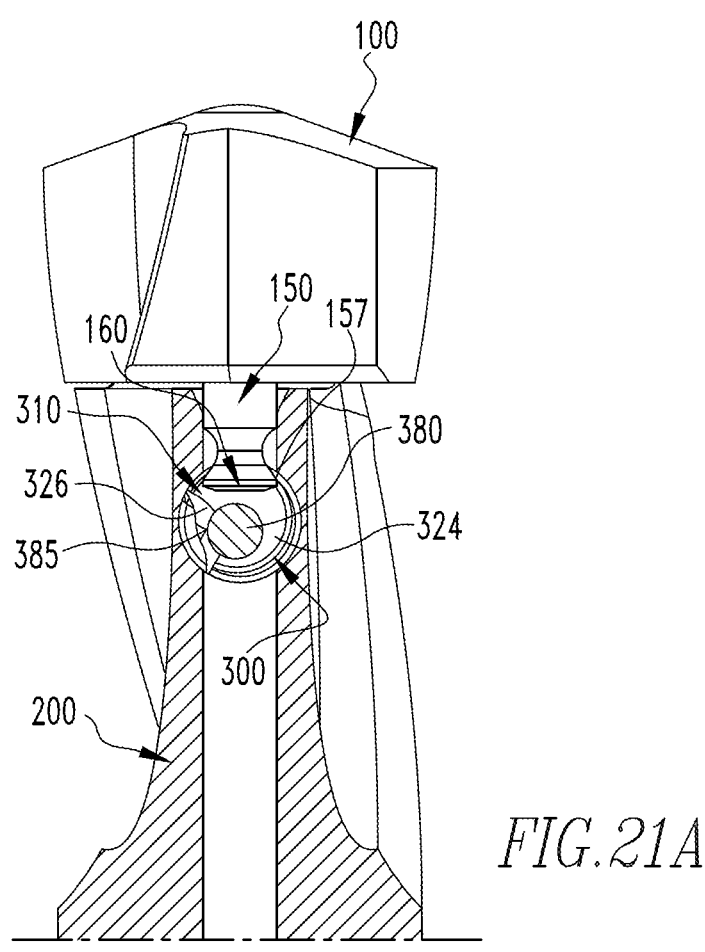
FIG. 21A is a partial cross-sectional view of the modular drill of FIG. 1 taken through section 20A-20A of FIG. 3 in a transitional position.
Figure 21B:
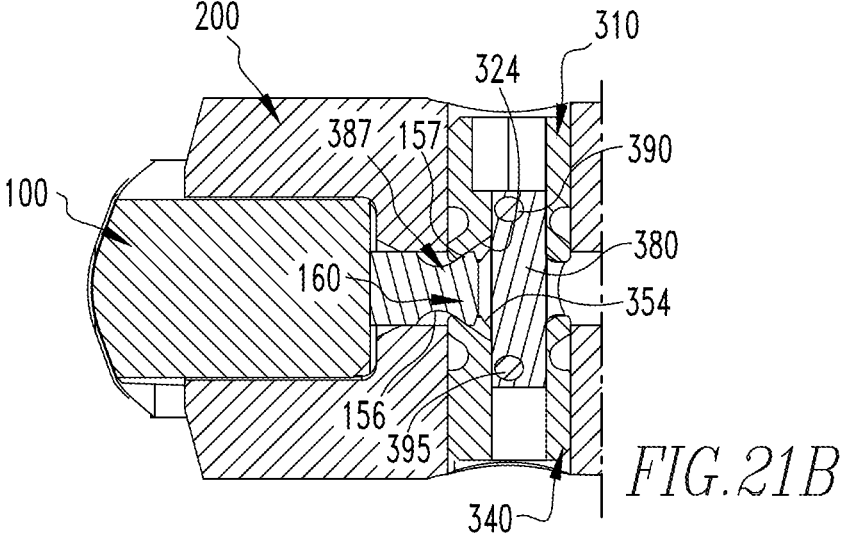
FIG. 21B is a cross-sectional view of the modular drill of FIG. 1 taken through section 4-4 of FIG. 3 in a transitional position.

As shown in FIGS. 21A and 21B, the double sided cam 300 may then be rotated in a first direction. The first direction may be a clockwise or counterclockwise direction, although the non-limiting embodiment of FIGS. 21A and 21B illustrate the first direction as being in the counterclockwise direction. As the double sided cam 300 is rotated in the first direction, the front cam surface 324 of the front portion 310 and the rear cam surface 354 of the rear portion 340 is structured and arranged to come in contact with the cam follower surface 157 of the draw pin head 160. Continued rotation of the double sided cam 300 in the first direction creates a force on the cam follower surface 157 of the draw pin head 160, pulling the draw pin head 160 further into the double sided cam 300. The force on the cam follower surface 157 may be a result of the front portion cam surface 324 and the rear portion cam surface 354 being offset from the central axis 50. As the double sided cam 300 is rotated, the draw pin cam slot 385 moves such that it is no longer aligned with the draw pin head 160. The draw pin cam slot 385 may rotate in a counter-clockwise direction during the rotation of the double sided cam 300. The cam surfaces 324, 354 maintain contact with the cam follower surface 157 of the draw pin head 160, thus maintaining the draw pin 150 locked in position.

Figure 22A:
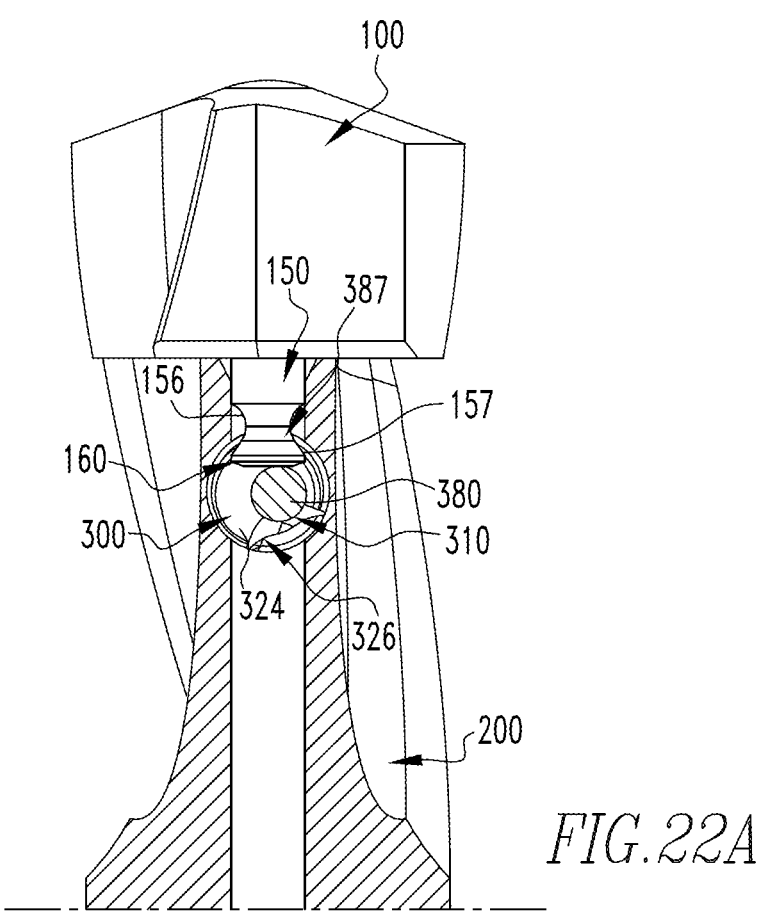
FIG. 22A is a partial cross-sectional view of the modular drill of FIG. 1 taken through section 20A-20A of FIG. 3 in a clamped position.
Figure 22B:
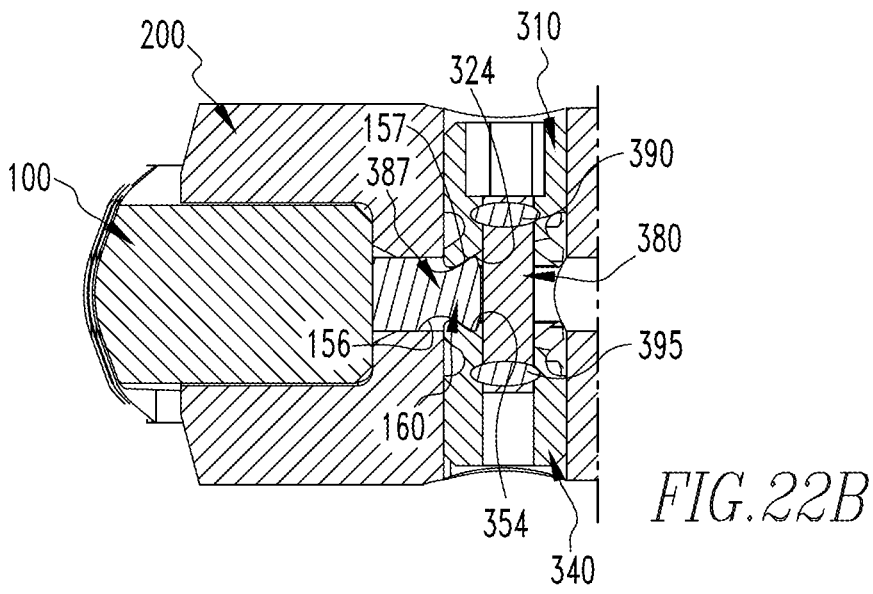
FIG. 22B is a cross-sectional view of the modular drill of FIG. 1 taken through section 4-4 of FIG. 3 in the clamped position.

FIGS. 22A and 22B show the double sided cam 300 in the fully clamped position. The fully clamped position is achieved by continuing the rotation of the double sided cam 300 such that the draw pin cam slot 385 continues to rotate around the central axis 50. The draw pin cam slot 385 may continue to rotate in a counter-clockwise direction. In this position, the draw pin bottom surface 155 is in contact with the connecting pin 380 while the draw pin cam slot 385 is located away from the draw pin 150. In this fully clamped position, the draw pin head 160 is held in position by the cam surfaces 324, 354 and the connecting pin 380. The cam surfaces 324, 354 maintain contact with the cam follower surface 157. In the clamped position, the connecting pin 380 may act as a hard stop to prevent the draw pin 150 from moving in a direction parallel to the rotational axis 40. The double sided cam 300 is prevented from rotating further by the contact between the connecting pin 380 and the draw pin 150.

The draw pin 150 may be released from the double sided cam 300 by reversing the rotation of the double sided cam 300 by rotating the double sided cam 300 in a second direction, the second direction being opposite the first direction. Once the double sided cam 300 is back in the unlocked position, further rotation of the double sided cam 300 causes the connecting pin 380 to apply a force with a component parallel to the rotational axis 40 on the draw pin head 160, pushing the draw pin 150 out of the draw pin slot 220. The force from the connecting pin 380 weakens the friction fit of the cutting head 100 by reducing the interference between the cutting head 100 and the tool shank 200, allowing the cutting head 100 to be released from the tool shank 200 with less effort.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A modular drill comprising:

a tool shank extending from a shank top end to a shank bottom end along a rotational axis and comprising a cam slot extending at least partially through a width of the tool shank;

a cutting head centered on the rotational axis comprising:

a cutting head top surface;

a cutting head bottom surface;

a draw pin extending from the cutting head bottom surface along the rotational axis; and a draw pin groove around at least a partial length of a circumference of the draw pin comprising a cam follower surface; and a double sided cam received within the cam slot of the tool shank, the double sided cam including a front portion and a rear portion and a connecting pin that connects the front portion and the rear portion, wherein the front portion and the rear portion include a conical cam surface contacting the cam follower surface, the conical cam surface having a vertex located on an axis parallel to and offset from a central axis of the cam slot.

2. The modular drill of claim 1, wherein the double sided cam further comprises:

the front portion extending along a central axis from a front portion top wall to a front portion bottom wall; and the rear portion opposite the front portion and separated from the front portion by a gap along the central axis, the rear portion extending along the central axis from a rear portion top wall to a rear portion bottom wall;

wherein the at least one cam surface includes a front cam surface extending from the front portion bottom wall toward the front portion top wall and a rear cam surface extending from the rear portion bottom wall toward the rear portion top wall.

3. The modular drill of claim 2, wherein the connecting pin engages the draw pin to release the cutting head from the tool shank.

4. The modular drill of claim 2, wherein the connecting pin extends from a connecting pin front end to a connecting pin back end, the connecting pin front end proximate the front portion and the connecting pin back end proximate the rear portion.

5. The modular drill of claim 2, wherein the connecting pin extends along an axis parallel to and offset from the central axis.

6. The modular drill of claim 2, wherein at least one of the front cam surface and the rear cam surface is a conical surface comprising a vertex centered around an axis parallel to the connecting pin.

7. The modular drill of claim 6, wherein the vertex the axis parallel to the connecting pin is parallel to and offset from the central axis.

8. The modular drill of claim 2, wherein the central axis is perpendicular to the rotational axis.

9. The modular drill of claim 2, wherein at least one of the front portion top wall and the rear portion top wall comprise a recess structured and arranged to receive a rotation tool.

10. The modular drill of claim 2, wherein a diameter of the draw pin is greater than a length of the gap.

11. The modular drill of claim 2, wherein the front portion further comprises a front clearance notch extending from an outside diameter of the front portion toward the central axis, and the rear portion further comprises a rear clearance notch extending from an outside diameter of the rear portion toward the central axis.

12. The modular drill of claim 11, wherein the rear clearance notch and the front clearance notch are aligned parallel to the central axis.

13. The modular drill of claim 12, wherein a diameter of the draw pin is less than a distance between an edge of the front clearance notch and an edge of the rear clearance notch.

14. The modular drill of claim 2, wherein a draw pin groove diameter of the draw pin groove is less than a length of the gap.

15. A cutting head for a modular drill comprising:

a cutting head top surface opposite a cutting head bottom surface centered along a rotational axis;

a draw pin extending from the cutting head bottom surface along the rotational axis and structured and arranged to be releasably secured to a tool shank; and a draw pin groove extending around at least a partial length of a circumference of the draw pin comprising a cam follower surface wherein the cam follower surface is structured and arranged to engage a double sided cam; the double sided cam including a front portion including a conical cam surface and a rear portion including a conical cam surface and a connecting pin that connects the front portion and the rear portion, wherein the conical cam surfaces contact the cam follower surface.

16. The cutting head of claim 15, wherein the draw pin groove extends along the entire circumference of the draw pin.

17. The cutting head of claim 15, wherein the draw pin groove forms a curved surface.

18. A double sided cam for a modular drill comprising:

a front portion extending along a central axis from a front portion top wall to a front portion bottom wall; and a rear portion opposite the front portion and separated from the front portion by a gap along the central axis, the rear portion extending along the central axis from a rear portion top wall to a rear portion bottom wall;

wherein, the front portion bottom wall comprises a front portion conical cam surface extending from the front portion bottom wall toward the front portion top wall, wherein the front portion conical cam surface is structured and arranged to engage a cam follower surface of a cutting head;

wherein the rear portion bottom wall comprises a rear portion conical cam surface extending from the rear portion bottom wall toward the rear portion top wall, wherein the rear portion conical cam surface is structured and arranged to engage the cam follower surface of the cutting head; and a connecting pin that connects the front portion and the rear portion.

* * * * *